(12) United States Patent
Lv

(10) Patent No.: US 9,989,794 B2
(45) Date of Patent: Jun. 5, 2018

(54) BACK PLATE AND LIQUID CRYSTAL DISPLAY DEVICE HAVING THE SAME

(71) Applicant: Shenzhen China Star Optoelectronics Technology Co., Ltd., Guangdong (CN)

(72) Inventor: Chengling Lv, Guangdong (CN)

(73) Assignee: Shenzhen China Star Optoelectronics Technology Co., Ltd., Shenzhen, Guangdong (CN)

(*) Notice: Subject to any disclaimer, the term of this patent is extended or adjusted under 35 U.S.C. 154(b) by 240 days.

(21) Appl. No.: 14/890,548

(22) PCT Filed: Oct. 21, 2015

(86) PCT No.: PCT/CN2015/092428
§ 371 (c)(1),
(2) Date: Nov. 11, 2015

(87) PCT Pub. No.: WO2017/049689
PCT Pub. Date: Mar. 30, 2017

(65) Prior Publication Data
US 2017/0184908 A1    Jun. 29, 2017

(30) Foreign Application Priority Data
Sep. 24, 2015 (CN) .......................... 2015 1 0615877

(51) Int. Cl.
G02F 1/1333     (2006.01)
F21V 8/00       (2006.01)

(52) U.S. Cl.
CPC ..... *G02F 1/133308* (2013.01); *G02B 6/0093* (2013.01); *G02F 2001/133302* (2013.01);
(Continued)

(58) Field of Classification Search
None
See application file for complete search history.

(56) References Cited

U.S. PATENT DOCUMENTS

| 8,960,987 B2 * | 2/2015 | Wu ...................... G02B 6/0085 362/373 |
| 9,366,804 B2 | 6/2016 | Hsiao et al. |
| 2007/0046852 A1 * | 3/2007 | Kim .................. G02F 1/133608 349/58 |

FOREIGN PATENT DOCUMENTS

| CN | 102798095 | 11/2012 |
| CN | 103807814 | 5/2014 |

(Continued)

OTHER PUBLICATIONS

International Search Report for PCT/CN2015/092428, Completed by the Chinese Patent Office, dated Jul. 1, 2016, 11 Pages.

*Primary Examiner* — Richard Kim
(74) *Attorney, Agent, or Firm* — Mintz Levin Cohn Ferris Glovsky and Popeo, P.C.; Kongsik Kim

(57) ABSTRACT

A back plate of a liquid crystal display (LCD) device includes a first region as an appearance of the entire LCD device, in which a plurality of first and second reinforcing ribs crossing each other are disposed, the plurality of first reinforcing ribs are arranged to be spaced apart from each other in a horizontal direction, and an angle α between the first reinforcing rib and a vertical direction ranges from 40° to 50°. The plurality of second reinforcing ribs are arranged to be spaced apart from each other in the horizontal direction, and an angle β between the second reinforcing rib and the vertical direction ranges from 40° to 50°. Each of the first reinforcing ribs at least crosses one of the second reinforcing ribs. A liquid crystal display device including the back plate as described above is also disclosed.

12 Claims, 3 Drawing Sheets

(52) U.S. Cl.
CPC ............ *G02F 2001/133314* (2013.01); *G02F 2201/54* (2013.01)

(56) References Cited

FOREIGN PATENT DOCUMENTS

| | | |
|---|---|---|
| JP | 2009259691 | 11/2009 |
| KR | 20110077272 | 7/2011 |

* cited by examiner

BACK PLATE AND LIQUID CRYSTAL DISPLAY DEVICE HAVING THE SAME

CROSS-REFERENCE TO RELATED APPLICATION

This application is the U.S. national phase of PCT Application No. PCT/CN2015/092428 filed on Oct. 21, 2015, which claims priority to CN Patent Application No. 201510615877.6 filed on Sep. 24, 2015, the disclosures of which are incorporated in their entirety by reference herein.

TECHNICAL FIELD

The present disclosure relates to the liquid crystal display technical field, and in particular, to a back plate of a liquid crystal display device and a liquid crystal display device having the same.

BACKGROUND ART

With the evolution of photoelectric and semiconductor technologies, the flourishing development of a flat panel display is driven, and in various flat panel displays, liquid crystal displays (LCDs) have become the mainstream of the market because of having various superior characteristics, such as high space utilization, low power consumption, no radiation and low electromagnetic interference or the like. Generally, a LCD device includes a back frame, a back light module (BLM), a liquid crystal panel and a front frame, wherein the back frame and the front frame are fixedly coupled to form an accommodating space, and the BLM and the liquid crystal panel are disposed opposite to each other and accommodated in the accommodating space. Furthermore, the back light module at least includes a back plate, and a light source, a reflective plate, a light guide plate and an optical film assembly disposed on the back plate.

In recent years, it is increasingly obvious that the LCD device tends to develop towards large size and lightening and thinning, and a design that the back plate in the back light module is exposed to the outside as a back frame of the entire device, i.e., an integration design, has become increasingly popular. In this situation, in order to improve the rigidity of the entire device so that it is not easily deformed, the back plate needs to be designed to have a larger thickness. The back plate having a larger thickness not only increases the cost, but also is disadvantageous to the lightening and thinning of the entire device.

SUMMARY

Due to the disadvantages existing in the related art, the present disclosure provides a back plate of a LCD device having a smaller thickness and being able to satisfy its rigidity requirement, which is helpful for the lightening and thinning of the entire LCD device and cost reduction.

In order to achieve the above objectives, the present disclosure adopts the following technical solution:

A back plate of a LCD device includes a first region as an appearance of the entire LCD device, in which a plurality of first reinforcing ribs and a plurality of second reinforcing ribs crossing each other are disposed, wherein the plurality of first reinforcing ribs are arranged to be spaced apart from each other in a horizontal direction, and an angle α between the first reinforcing rib and a vertical direction ranges from 40° to 50°; the plurality of second reinforcing ribs are arranged to be spaced apart from each other in the horizontal direction, and an angle β between the second reinforcing rib and the vertical direction ranges from 40° to 50°; and each of the first reinforcing ribs at least crosses one of the second reinforcing ribs.

The plurality of first reinforcing ribs are parallel to each other; and the plurality of second reinforcing ribs are parallel to each other.

An angle γ between the first reinforcing rib and the second reinforcing rib ranges from 80° to 100°.

At least a portion of crossing parts between the first and second reinforcing ribs are of a "+" shape or approximate to the " | " shape, wherein being of the " | " shape refers to a case where γ is equal to 90°, and being approximate to the " | " shape refers to a case where γ is not equal to 90°.

At least a portion of crossing parts between the first and second reinforcing ribs are of a "T" shape or approximate to the "T" shape, wherein being of the "T" shape refers to a case where γ is equal to 90°, and being approximate to the "T" shape refers to a case where γ is not equal to 90°.

At least a portion of crossing parts between the first and second reinforcing ribs are of a "L" shape or approximate to the "L" shape, wherein being of the "L" shape refers to a case where γ is equal to 90°, and being approximate to the "L" shape refers to a case where γ is not equal to 90°.

The numbers of the first reinforcing ribs and the second reinforcing ribs are three to five, respectively.

The back plate further includes a second region for accommodating circuit elements, with a cover for covering the circuit elements connected thereon.

The present disclosure further provides a LCD device including the back plate as described above, and a back light module and a liquid crystal panel sequentially disposed on the back plate, wherein the back light module includes a light source, a reflective plate, a light guide plate and an optical film assembly disposed on the back plate.

In comparison with the related art, embodiments of the present disclosure provide a back plate of a LCD device, wherein a plurality of first reinforcing ribs and a plurality of second reinforcing ribs crossing each other are disposed in a first region as an appearance of the entire LCD device and have crossing parts in a "+" shape, "T" shape or "L" shape therebetween, so that the back plate has a smaller thickness and can satisfy its rigidity requirement, thereby being helpful for the lightening and thinning of the entire LCD device and cost reduction.

DETAILED DESCRIPTION OF EXEMPLARY EMBODIMENTS

Hereinafter, the technical solutions in the embodiments of the present disclosure will be described in detail in conjunction with the accompanying drawings and the particular embodiments. Obviously, the described embodiments are only a part of the embodiments of the present disclosure rather than all the exemplary embodiments. Based on the embodiments of the present disclosure, all the other embodiments acquired by those of ordinary skill in the art without exerting any creative efforts fall within the protection scope of the present disclosure.

Embodiment 1

Figure 1:
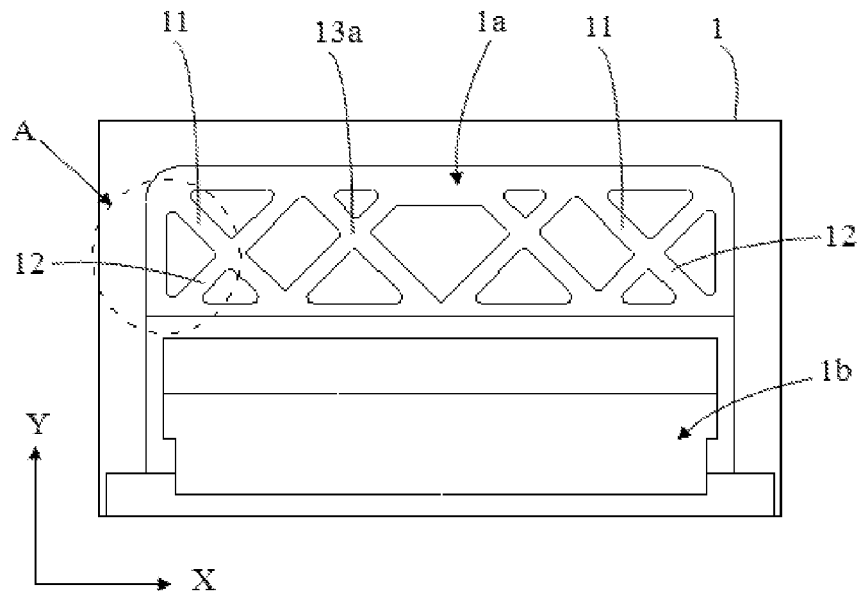
FIG. 1 is a structure diagram of a back plate according to an embodiment of the present disclosure.
Figure 2:
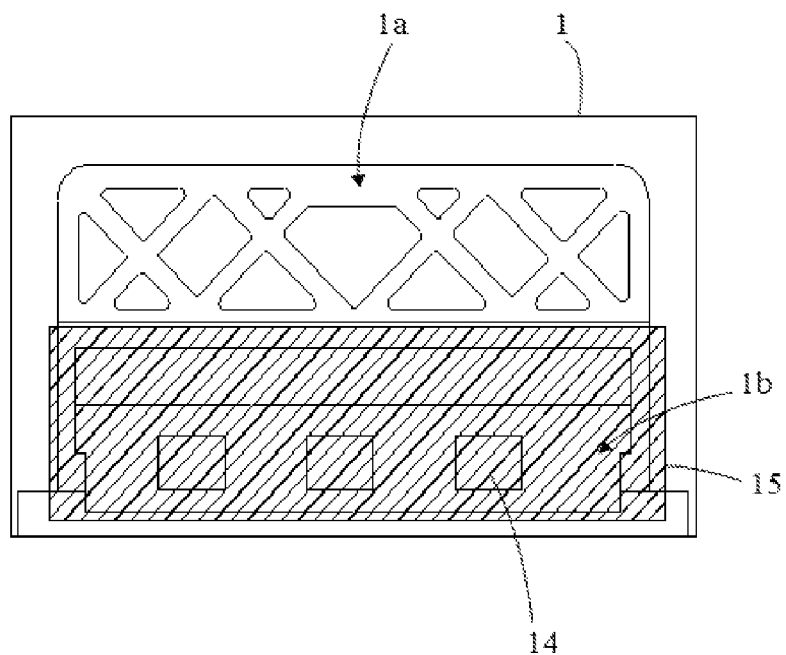
FIG. 2 is an enlarged diagram of portion A as shown in FIG. 1.
Figure 3:
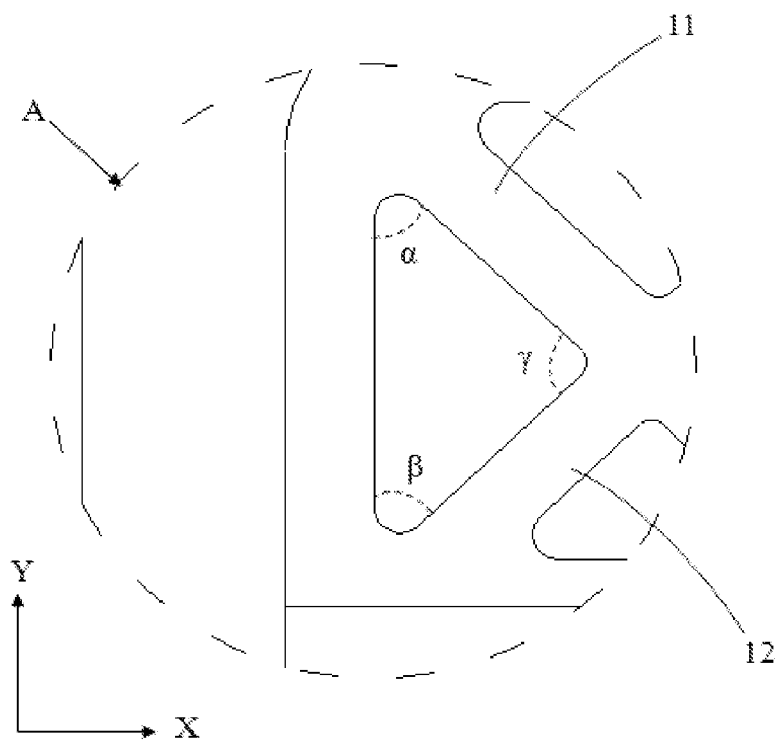
FIG. 3 is an exemplary diagram illustrating that circuit elements are accommodate in the back plate of FIG. 1.

Referring to FIGS. 1-3, the present embodiment provides a back plate of a LCD device, wherein the back plate 1 is mainly applied to an integrated LCD device, and includes a first region 1a and a second region 1b. As illustrated in FIG. 2, the second region 1b is used to accommodate circuit elements 14 with a cover 15 for covering the circuit elements 14 connected thereon, wherein the first region 1a and the cover 15 together form an appearance of a back surface of the LCD device.

As illustrated in FIGS. 1 and 2, a plurality of first reinforcing ribs 11 and a plurality of second reinforcing ribs 12 crossing each other are disposed in the first region 1a. The plurality of first reinforcing ribs 11 are arranged to be spaced apart from each other in a horizontal direction (X direction as shown in the figures), and an angle α between the first reinforcing rib 11 and a vertical direction (Y direction as shown in the figures) may be selected to be 40° to 50°. The plurality of second reinforcing ribs 12 are arranged to be spaced apart from each other in the horizontal direction (X direction as shown in the figures), and an angle β between the second reinforcing rib 12 and the vertical direction (Y direction as shown in the figures) may be selected to be 40° to 50°. Each of the first reinforcing ribs 11 at least crosses one of the second reinforcing ribs 12, and an angle γ between the first reinforcing rib 11 and the second reinforcing rib 12 may be selected to be 80° to 100°.

Specific to the present embodiment, the plurality of first reinforcing ribs 11 are parallel to each other; and the plurality of second reinforcing ribs 12 are also parallel to each other. The angle α is selected to be 45°, the angle β is also selected to be 45°, and at this time, the angle γ is 90°, that is to say, the first reinforcing ribs 11 and the second reinforcing ribs 12 are perpendicular to each other. Furthermore, as illustrated in FIG. 1, a crossing part 13a between the first reinforcing rib 11 and the second reinforcing rib 12 is of a "+" shape, that is, if taking the crossing part 13a as a central point, the first reinforcing rib 11 extends toward both ends from the crossing part 13a, and the second reinforcing rib 12 also extends toward both ends from the crossing part 13a. In addition, if the values of the angles α and β are selected such that γ is unequal to 90°, the crossing part 13a between the first reinforcing rib 11 and the second reinforcing rib 12 is defined to be approximate to the "+" shape.

In the present embodiment, as illustrated in FIG. 1, the numbers of the first reinforcing ribs 11 and the second reinforcing ribs 12 are four, respectively. The numbers of the first and second reinforcing ribs 11 and 12 may be selected and set according to a length of the first region 1a, which does not need to be specifically defined, and a preferable number range is from three to five. Meanwhile, the number of the first reinforcing ribs 11 may be set to be equal or unequal to that of the second reinforcing ribs 12.

By disposing the structure having the first and second reinforcing ribs as described above, the back plate has a smaller thickness and can satisfy its rigidity requirement, which is helpful for the lightening and thinning of the entire LCD device and cost reduction. In contrast, the back plate without the above reinforcing rib structure in the related art has a thickness that needs to be designed to be more than 1 mm. However, the back plate according to the present embodiment is provided with the first and second reinforcing ribs crossing in the "+" shape, thus, its thickness may be designed to be 0.8 mm or less. Furthermore, when a deformation test is performed on the two kinds of back plates as described above under the same conditions, a deformation quantity of the back plate provided by the present embodiment is decreased by about 10%, which has a greater rigidity in comparison with the related art.

Embodiment 2

Figure 4:
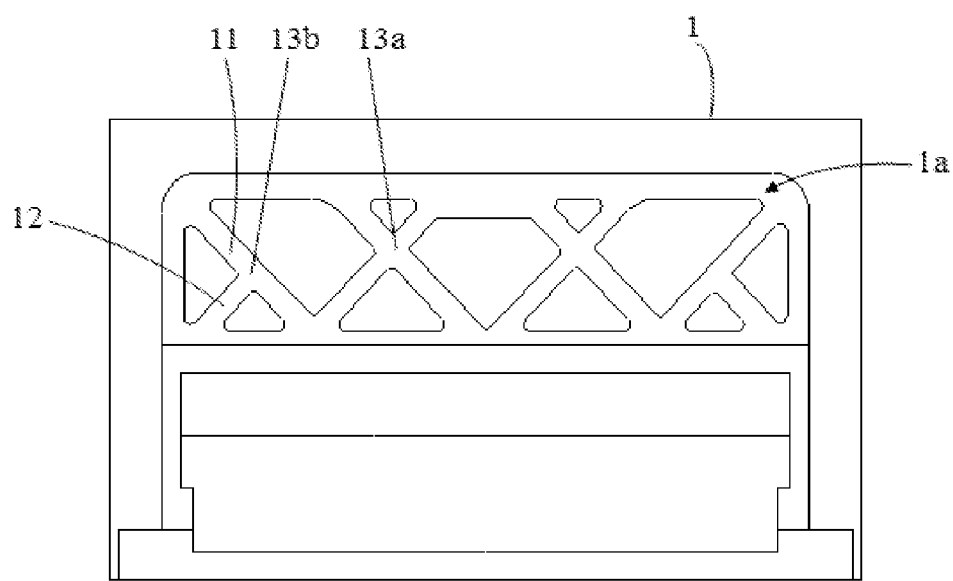
FIG. 4 is a structure diagram of a back plate according to another embodiment of the present disclosure.

The present embodiment differs from embodiment 1 in that: as illustrated in FIG. 4, in the first region 1a of the back plate 1, among the crossing parts between the first reinforcing ribs 11 and the second reinforcing ribs 12, some crossing parts 13a are of the "+" shape as described in embodiment 1, while other crossing parts 13b are of a "T" shape.

Regarding the "T" shaped crossing, if taking the crossing part 13b as a central point, the first reinforcing rib 11 extends toward both ends from the crossing part 13b, while the second reinforcing rib 12 extends toward only one end from the crossing part 13b; or, the second reinforcing rib 12 extends toward both ends from the crossing part 13b, while the first reinforcing rib 11 extends toward only one end from the crossing part 13b; and at this time, the first reinforcing ribs 11 and the second reinforcing ribs 12 are perpendicular to each other. In addition, if the values of the angles are selected such that the first and second reinforcing ribs 11 and 12 are not perpendicular to each other, the crossing part 13b between the first reinforcing rib 11 and the second reinforcing rib 12 is defined to be approximate to the "T" shape.

In contrast, the back plate without the above reinforcing rib structure in the related art has a thickness that needs to be designed to be more than 1 mm. However, the back plate according to the present embodiment is provided with the first and second reinforcing ribs crossing in the "+" shape and "T" shape, thus, its thickness may be designed to be 0.8 mm or less. Furthermore, when a deformation test is performed on the two kinds of back plates as described above under the same conditions, a deformation quantity of the back plate provided by the present embodiment is decreased by about 9%, which has a greater rigidity in comparison with the related art.

Embodiment 3

Figure 5:
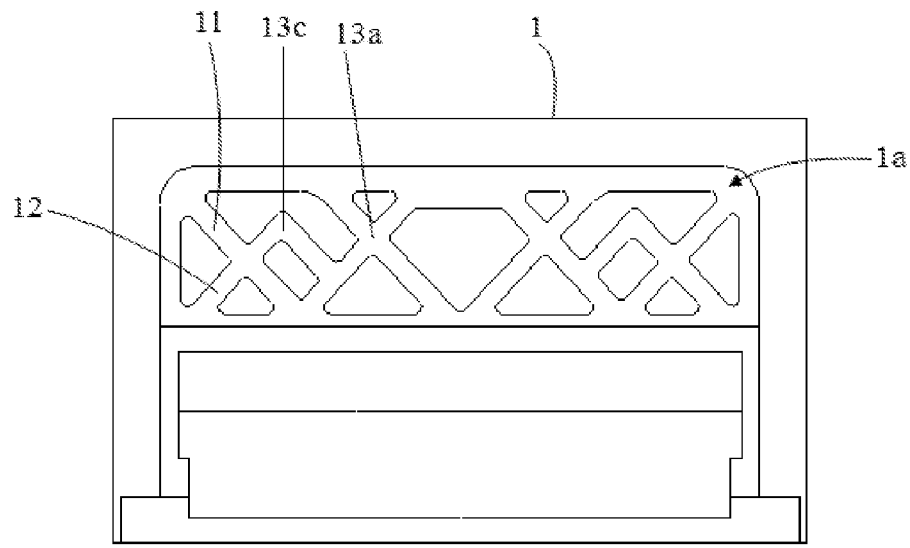
FIG. 5 is a structure diagram of a back plate according to another embodiment of the present disclosure.

The present embodiment differs from embodiment 1 in that: as illustrated in FIG. 5, in the first region 1a of the back plate 1, among the crossing parts between the first reinforcing ribs 11 and the second reinforcing ribs 12, some crossing parts 13a are of the " | " shape as described in embodiment 1, while other crossing parts 13c are of a "L" shape.

Regarding the "L" shaped crossing, if taking the crossing part 13c as a central point, the first reinforcing rib 11 and the second reinforcing rib 12 extend toward only one end from the crossing part 13c respectively, and at this time, the first reinforcing ribs 11 and the second reinforcing ribs 12 are perpendicular to each other. In addition, if the values of the angles are selected such that the first and second reinforcing ribs 11 and 12 are not perpendicular to each other, the crossing part 13c between the first reinforcing rib 11 and the second reinforcing rib 12 is defined to be approximate to the "L" shape.

In contrast, the back plate without the above reinforcing rib structure in the related art has a thickness that needs to be designed to be more than 1 mm. However, the back plate according to the present embodiment is provided with the first and second reinforcing ribs crossing in the " | " shape and "L" shape, thus, its thickness may be designed to be 0.8 mm or less. Furthermore, when a deformation test is performed on the two kinds of back plates as described above under the same conditions, a deformation quantity of the back plate provided by the present embodiment is decreased by about 8%, which has a greater rigidity in comparison with the related art.

In addition, as a variable structure, the present embodiment may design a portion of the crossing parts between the first reinforcing ribs 11 and the second reinforcing ribs 12 in the "+" shape as the crossing parts 13a described in embodiment 1, another portion of the crossing parts in the "T" shape as the crossing parts 13b described in embodiment 2, and other crossing parts in the "L" shape as the crossing parts 13c, based on embodiment 2 in conjunction with FIGS. 1, 4 and 5.

Embodiment 4

Figure 6:
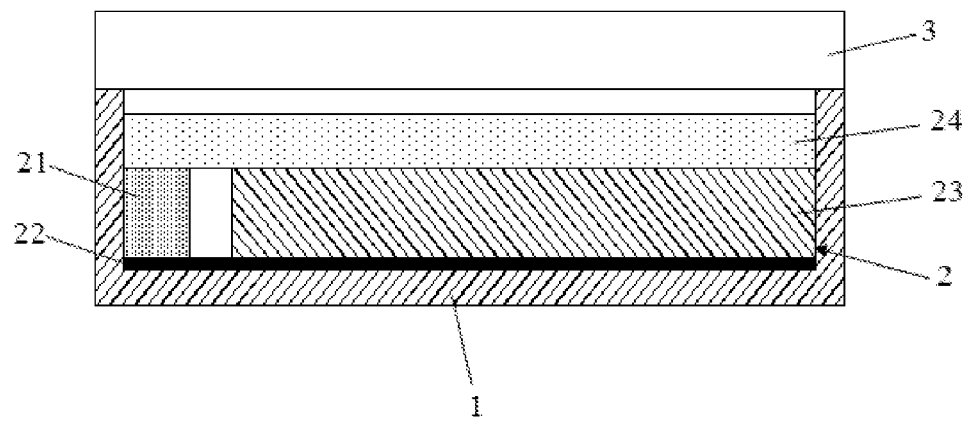
FIG. 6 is a structure diagram of a LCD device according to embodiments of the present disclosure.

The present embodiment provides an integrated LCD device including the back plate 1, and a back light module 2 and a liquid crystal panel 3 sequentially disposed on the back plate 1, as illustrated in FIG. 6. The back plate 1 adopts the back plate 1 as provided in embodiments 1, 2 and 3, and the back light module 2 and the liquid crystal panel 3 are disposed on a front surface of the back plate 1 opposite to the surface on which the reinforcing rib structure is provided. In particular, the back light module 2 includes a light source 21, and a reflective plate 22, a light guide plate 23 and an optical film assembly 24 sequentially disposed on the back plate 1, wherein the light source 21 is disposed on the reflective plate 22 and located on one side of the light guide plate 23. Light emitted from the light source 21 is incident into the liquid crystal panel 3 through the light guide plate 23 and the optical film assembly 24.

As above, the embodiments of the present disclosure provide a back plate of a LCD device, wherein a plurality of first reinforcing ribs and a plurality of second reinforcing ribs crossing each other are disposed in a first region as an appearance of the entire LCD device and have crossing parts in the "+" shape, "T" shape or "L" shape therebetween, so that the back plate has a smaller thickness and can satisfy its rigidity requirement, thereby being helpful for the lightening and thinning of the entire LCD device and cost reduction.

It should be explained that the relationship terms, such as first and second, etc., in the present text are only used for distinguishing one entity or operation from another entity or operation without requiring or implying any actual relation or sequence existing between these entities or operations. Moreover, the term "include", "comprise" or any other variant thereof intends to cover non-exclusive inclusion, so that the process, method, object or apparatus including a series of factors not only includes those factors but also includes other factors that are not explicitly listed or inherent factors to this process, method, object or apparatus. Without any more limitations, the factors defined by the sentence "include one . . . " do not exclude the presence of additional identical factors in the process, method, object or apparatus which includes the factors.

The above descriptions are only the particular embodiments of the present application, it should be noted that, to those of ordinary skill in the art, several improvements and polish may be made without deviating from the principle of the present application, and those improvements and polish should be considered as the protection scope of the present application.

What is claimed:

1. A back plate of a liquid crystal display (LCD) device comprising a first region as an appearance of the entire LCD device, in which a plurality of first reinforcing ribs and a plurality of second reinforcing ribs crossing each other are disposed, wherein the plurality of first reinforcing ribs are arranged to be spaced apart from each other in a horizontal direction, and an angle α between the first reinforcing rib and a vertical direction ranges from 40° to 50°; the plurality of second reinforcing ribs are arranged to be spaced apart from each other in the horizontal direction, and an angle β between the second reinforcing rib and the vertical direction ranges from 40° to 50°; and each of the first reinforcing ribs at least crosses one of the second reinforcing ribs;

wherein at least a portion of crossing parts between the first and second reinforcing ribs are of a "+" shape or approximate to the " | " shape, wherein being of the "+" shape refers to a case where γ is equal to 90°, and being approximate to the " | " shape refers to a case where γ is not equal to 90°;

wherein at least a portion of the crossing parts between the first and second reinforcing ribs are of a "L" shape or approximate to the "L" shape, wherein being of the "L" shape refers to a case where γ is equal to 90°, and being approximate to the "L" shape refers to a case where γ is not equal to 90°; and wherein at least a " | " shape and at least a "L" shape form a "╤" shape, or at least an approximate " | " shape and at least an approximate "L" shape form an approximate "╌" shape.

2. The back plate of the LCD device of claim 1, wherein the plurality of first reinforcing ribs are parallel to each other; and the plurality of second reinforcing ribs are parallel to each other.

3. The back plate of the LCD device of claim 1, wherein an angle γ between the first reinforcing rib and the second reinforcing rib ranges from 80° to 100°.

4. The back plate of the LCD device of claim 1, wherein at least a portion of the crossing parts between the first and second reinforcing ribs are of a "T" shape or approximate to the "T" shape, wherein being of the "T" shape refers to a case where γ is equal to 90°, and being approximate to the "T" shape refers to a case where γ is not equal to 90°.

5. The back plate of the LCD device of claim 1, wherein the number of the first reinforcing ribs is three to five, and the number of the second reinforcing ribs is three to five.

6. The back plate of the LCD device of claim 1, wherein the back plate further comprises a second region for accommodating circuit elements, with a cover for covering the circuit elements connected thereon.

7. A liquid crystal display (LCD) device comprising a back plate, and a back light module and a liquid crystal panel sequentially disposed on the back plate, wherein the back light module comprises a light source, a reflective plate, a light guide plate and an optical film assembly disposed on the back plate, wherein the back plate comprises a first region as an appearance of the entire LCD device, in which a plurality of first reinforcing ribs and a plurality of second reinforcing ribs crossing each other are disposed, wherein the plurality of first reinforcing ribs are arranged to be spaced apart from each other in a horizontal direction, and an angle α between the first reinforcing rib and a vertical direction ranges from 40° to 50°; the plurality of second reinforcing ribs are arranged to be spaced apart from each other in the horizontal direction, and an angle β between the second reinforcing rib and the vertical direction ranges from 40° to 50°; and each of the first reinforcing ribs at least crosses one of the second reinforcing ribs;

wherein at least a portion of crossing parts between the first and second reinforcing ribs are of a " | " shape or approximate to the "+" shape, wherein being of the "+" shape refers to a case where γ is equal to 90°, and being approximate to the " | " shape refers to a case where γ is not equal to 90°;

wherein at least a portion of the crossing parts between the first and second reinforcing ribs are of a "L" shape or approximate to the "L" shape, wherein being of the "L" shape refers to a case where γ is equal to 90°, and being approximate to the "L" shape refers to a case where γ is not equal to 90°; and wherein at least a "+" shape and at least a "L" shape form a " ╪ " shape, or at least an approximate "+" shape and at least an approximate "L" shape form an approximate " ╤ " shape.

8. The LCD device of claim 7, wherein the plurality of first reinforcing ribs are parallel to each other; and the plurality of second reinforcing ribs are parallel to each other.

9. The LCD device of claim 7, wherein an angle γ between the first reinforcing rib and the second reinforcing rib ranges from 80° to 100°.

10. The LCD device of claim 7, wherein at least a portion of the crossing parts between the first and second reinforcing ribs are of a "T" shape or approximate to the "T" shape, wherein being of the "T" shape refers to a case where γ is equal to 90°, and being approximate to the "T" shape refers to a case where γ is not equal to 90°.

11. The LCD device of claim 7, wherein the number of the first reinforcing ribs is three to five, and the number of the second reinforcing ribs is three to five.

12. The LCD device of claim 7, wherein the back plate further comprises a second region for accommodating circuit elements, with a cover for covering the circuit elements connected thereon.

* * * * *